United States Patent
Price et al.

(10) Patent No.: US 9,077,676 B2
(45) Date of Patent: Jul. 7, 2015

(54) INTELLIGENT MESSAGING

(75) Inventors: Edward D. Price, Brooklyn, NY (US); William Todd Piett, Southborough, MA (US)

(73) Assignee: RAVE WIRELESS, INC., Framingham, MA (US)

( * ) Notice: Subject to any disclaimer, the term of this patent is extended or adjusted under 35 U.S.C. 154(b) by 426 days.

(21) Appl. No.: 13/293,662

(22) Filed: Nov. 10, 2011

(65) Prior Publication Data

US 2012/0117178 A1    May 10, 2012

Related U.S. Application Data

(60) Provisional application No. 61/412,148, filed on Nov. 10, 2010.

(51) Int. Cl.
| | |
|---|---|
| G06F 15/16 | (2006.01) |
| G06F 15/173 | (2006.01) |
| H04L 12/58 | (2006.01) |
| H04W 28/08 | (2009.01) |

(52) U.S. Cl.
CPC ............ *H04L 51/30* (2013.01); *H04W 28/08* (2013.01); *H04W 28/085* (2013.01); *H04L 51/38* (2013.01)

(58) Field of Classification Search
CPC .......................... H04W 28/08; H04W 28/085
USPC ......... 455/453, 452, 450, 455, 464, 407, 512; 370/328, 329, 348, 441, 443, 465, 468, 370/432, 437, 230.1, 230
See application file for complete search history.

(56) References Cited

U.S. PATENT DOCUMENTS

| | | | | |
|---|---|---|---|---|
| 7,453,844 | B1 * | 11/2008 | Lee et al. | 370/329 |
| 8,103,742 | B1 * | 1/2012 | Green | 709/218 |
| 8,553,525 | B2 * | 10/2013 | Choi et al. | 370/211 |
| 2002/0120697 | A1 * | 8/2002 | Generous et al. | 709/206 |
| 2004/0213288 | A1 * | 10/2004 | Lynn et al. | 370/468 |
| 2004/0264394 | A1 * | 12/2004 | Ginzburg et al. | 370/310 |
| 2005/0215265 | A1 * | 9/2005 | Sharma | 455/453 |
| 2006/0120282 | A1 * | 6/2006 | Carlson et al. | 370/229 |
| 2006/0205423 | A1 * | 9/2006 | Blair et al. | 455/512 |
| 2008/0200144 | A1 * | 8/2008 | Ginsberg et al. | 455/407 |
| 2010/0250735 | A1 * | 9/2010 | Andersen | 709/224 |
| 2011/0122788 | A1 * | 5/2011 | Sombrutzki et al. | 370/252 |
| 2011/0287802 | A1 * | 11/2011 | Ma et al. | 455/517 |
| 2012/0246301 | A1 * | 9/2012 | Vyrros et al. | 709/224 |
| 2013/0072214 | A1 * | 3/2013 | Quan et al. | 455/452.2 |
| 2013/0088961 | A1 * | 4/2013 | Ramachandran et al. | 370/235 |

* cited by examiner

*Primary Examiner* — Aftab N. Khan
(74) *Attorney, Agent, or Firm* — Occhiuti & Rohlicek LLP

(57) ABSTRACT

A method includes sending notification messages to a plurality of subscribers of a notification platform via a plurality of communications devices of the subscribers over a plurality of communications channels, each communications device associated with at least one of the plurality of communications channels, including sending notification messages to devices over first channels associated with the communications devices. The method also includes monitoring a status of the first channels and a status of the notification messages sent over the first channels; and adapting the sending of the notification messages according to the monitored statuses, including sending at least some of the notification messages over second channels associated with the communications devices.

28 Claims, 4 Drawing Sheets

INTELLIGENT MESSAGING

CROSS-REFERENCE TO RELATED APPLICATIONS

This application claims priority to U.S. Provisional Application Ser. No. 61/412,148, entitled "Intelligent Messaging Platform," filed Nov. 10, 2010, the contents of which are incorporated herein by reference.

BACKGROUND

This application relates to intelligent messaging.

Reliable and rapid delivery of large numbers of text messages is important to enterprises, public safety agencies, universities, and others with a need to quickly notify interested parties.

There are various protocols for delivering short message service (SMS) text messages, primarily SMPP (Short Message Peer-to-Peer) and SMTP (Simple Mail Transfer Protocol). Each of these protocols presents different challenges for effective message delivery.

SMTP is inherently slow and unreliable. Due to its open nature and vulnerability to abuse, SMTP is often throttled or otherwise restricted by wireless service providers. Furthermore, SMTP is typically unable to provide information about the success or failure of a transmission as a message passes through downstream systems to reach a targeted mobile subscriber.

SMPP is a more secure and robust protocol. SMPP is not subject to the same wireless service provider throttling and restrictions, but is still closely regulated by wireless carriers. Unlike SMTP, SMPP is not open to anyone who wishes to send an SMS message. Rather, entities that want to gain access to an SMPP connection must apply for access and open their messaging platform to audit by the wireless carriers.

Third parties, referred to as aggregators, have emerged as mediators between wireless carriers and entities wishing to send SMS over SMPP. Aggregators ensure that the rules established by the mobile industry and by each wireless service provider are adhered to by the entities sending messages. In addition, aggregators maintain "binds," or connections, across multiple wireless service providers. Binds allow message sending entities to gain access to multiple wireless carrier networks while maintaining a connection to only a single SMS message aggregator. In general, SMPP aggregators differ among themselves with respect to the mobile carriers they support, the reliability of their systems, and their message throughput.

Binds to service providers, either directly to wireless carriers or through third party aggregators, are prone to failure and normally to not provide service level agreements for message delivery.

Entities sending messages through aggregators are assigned a single 5- or 6-digit "short code," which is used to uniquely identify the message sending entity to its subscribers, regardless of the subscriber's mobile service provider.

SUMMARY

In a general aspect, a computer-implemented method includes sending notification messages to a plurality of subscribers of a notification platform via a plurality of communications devices of the subscribers over a plurality of communications channels, each communications device associated with at least one of the plurality of communications channels, including sending notification messages to devices over first channels associated with the communications devices. The method further includes monitoring a status of the first channels and a status of the notification messages sent over the first channels; and adapting the sending of the notification messages according to the monitored statuses, including sending at least some of the notification messages over second channels associated with the communications devices.

Embodiments may include one or more of the following.

Sending notification messages includes, for a first one of the communications devices: identifying a first communications channel for communication with the first one of the communications devices; and sending the notification message to the first one of the communications devices via the first communications channel.

Adapting the sending of the notification messages includes, for the first one of the communications devices: identifying a second communications channel for communication with the first one of the communications devices; and sending the notification message to the first one of the communications devices via the second communications channel.

Identifying the first communications channel includes identifying a mobile communications carrier associated with the mobile communications device. Identifying the first communications channel includes selecting a communications channel based on at least one of a type of connection associated with the communications channel and a status of the communications channel. Identifying the first communications channel includes employing a load balancing mechanism.

At least one of the first channels includes an aggregator, and a status of at least one of the first channels includes a throughput of the aggregator.

The status of the notification messages includes at least one of a transmission status of the notification messages through the first communications channels and a delivery status of the notification messages to the communications devices.

Monitoring a status of the notification messages includes determining the status of a first notification message based on an event associated with the first notification message. Determining the status of a first notification message includes receiving an event status message indicative of the event associated with the first notification message from a component of the corresponding first communications channel.

Monitoring a status of the first communications channels includes receiving no response from a component of one of the first communications channels within a predetermined amount of time.

Adapting the sending of the notification messages according to the monitored status includes sending at least some of the notification messages over second channels if the results of the monitoring are indicative of a transmission failure.

The second channels are different from the first channels.

The method further includes monitoring a status of the second communications channels and a status of the notification messages sent over the second channels. The method further includes updating a status of the subscribers based on at least one of the status of the first communications channels, the status of the notification messages sent over the first channels, the status of the second communications channels, and the status of the notification messages sent over the second channels.

The method further includes accepting an instruction to send the notification messages to the plurality of subscribers.

The notification message is at least one of a short message service (SMS) message, a voice message, and an email.

In another general aspect, a system includes a message routing module configured to send notification messages to a plurality of subscribers of a notification platform via a plurality of communications devices of the subscribers over a plurality of communications channels, each communications device associated with at least one of the plurality of communications channels, including sending notification messages to devices over first channels associated with the communications devices; and a message status module configured to monitor a status of the first channels and a status of the notification messages sent over the first channels. The message routing module is further configured to adapt the sending of the notification messages according to the monitored statuses, including sending at least some of the notification messages over second channels associated with the communications devices.

Embodiments may include one or more of the following.

The message routing module comprises a channel selection module configured to identify a first channel for communication with a first one of the communications devices; and an output module configured to send the notification message to the first one of the communications devices via the first communications channel.

The channel selection module is configured to identify a mobile communications carrier associated with the communications device. The channel selection module is configured to identify the first channel based on at least one of a type of connection associated with the first channel and a status of the first channel. The channel selection module is configured to employ a load balancing mechanism to identify the first channel.

The message status module is configured to determine the status of a first notification message based on an event associated with the first notification message.

The message routing module is configured to send at least some of the notification messages over second channels if the results of the monitoring are indicative of a transmission failure.

The message status module is further configured to monitor a status of the second channels and a status of the notification messages sent over the second channels.

The system further includes a subscriber data module configured to update a status of the subscribers based on at least one of the status of the first communications channels, the status of the notification messages sent over the first channels, the status of the second communications channels, and the status of the notification messages sent over the second channels.

The system further includes an input module configured to accept instructions to send the notification messages to the plurality of subscribers.

The systems and methods described herein have a number of advantages. For instance, the intelligent messaging platform is a high reliability, high performance messaging platform that is capable of leveraging the strengths of each message delivery alternative to enhance the throughput and overall delivery rates for messages. In addition, the platform provides a strategy for mitigating system outages, throughput limitations, visibility into message delivery status, and message delivery latency.

The intelligent messaging platform described herein is able to adaptively deliver messages, including SMS messages, voice messages, and emails, to subscribers according to subscriber preferences and based on real time feedback about the status of delivery channels.

Other features and advantages of the invention are apparent from the following description and from the claims.

DETAILED DESCRIPTION

1 Overview

Figure 1:
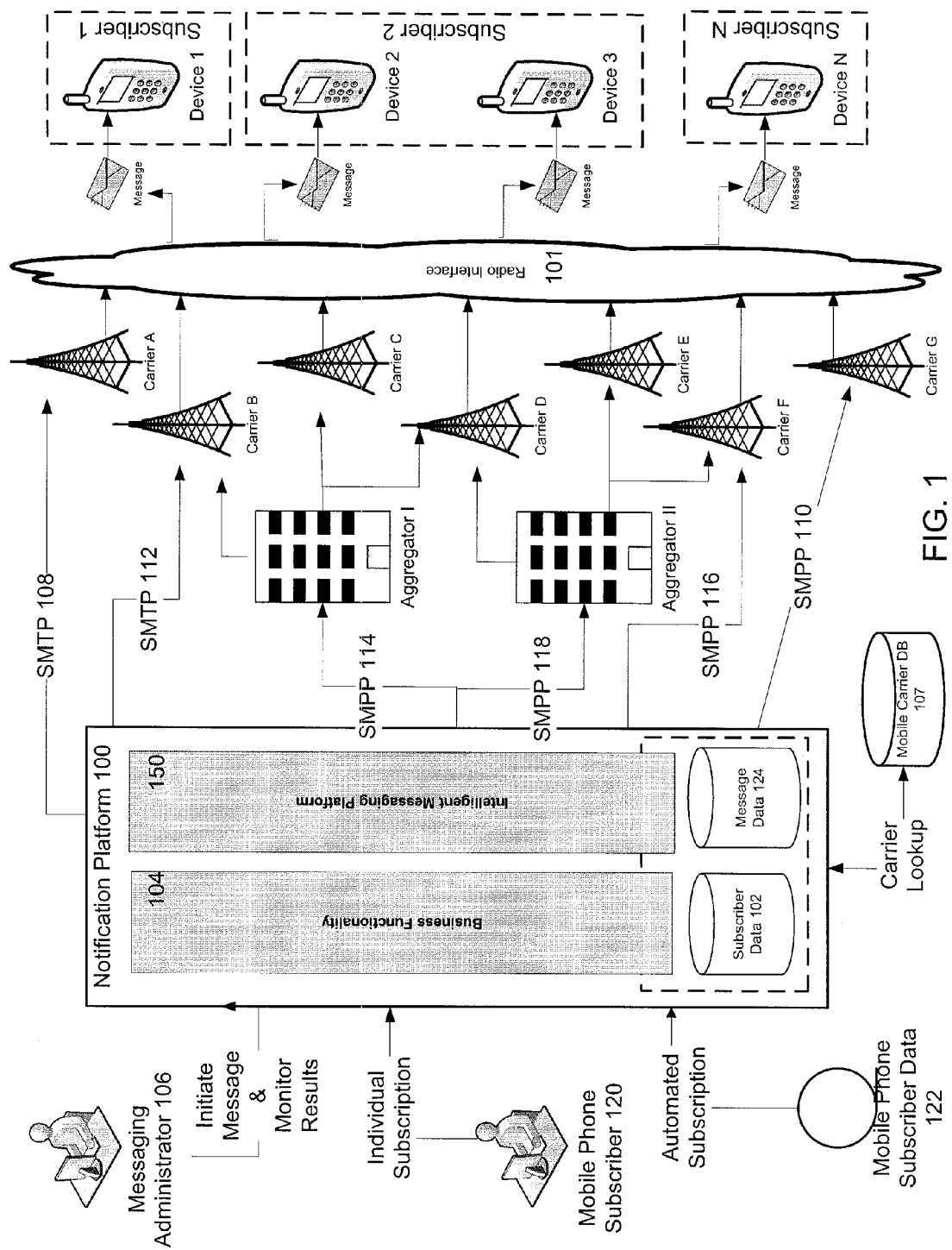
FIG. 1 is a block diagram of an intelligent messaging platform and associated interfaces.

Referring to FIG. 1, a notification platform 100 administers the distribution of short message service (SMS) messages or other electronic communications to subscribers to the notification platform. Notification platform 100 includes an intelligent messaging platform 150 which determines the appropriate channel for delivery of the message to the device(s) used by each subscriber. Intelligent messaging platform 150 routes and reroutes messages to subscribers, evaluates and acts upon status updates related to message delivery, and keeps administrators apprised of messaging status. In particular, intelligent messaging platform 150 enables the leveraging of multiple delivery channels by selecting which channel to utilize for the delivery of an SMS message to each subscriber based on its knowledge of the subscriber's phone number and mobile telecommunications carrier, business and/or operational preferences (e.g., which one of multiple devices is to be contacted), and dynamic and/or real-time message delivery status data.

Subscribers to the notification platform receive messages from the notification platform. For instance, university students may subscribe to a safety alert notification platform associated with the university to receive messages relevant to public safety at their university. Residents of a city and/or commuters to that city may subscribe to a local traffic alert notification platform to receive traffic status messages. In some cases, enrollment in a notification platform is initiated by an individual 120. For instance, each resident and each commuter may decide whether he wishes to join the traffic alert group. In other instances, enrollment in a notification platform is automatic and/or mandatory. For example, any university student who provides his mobile phone number to the university is automatically enrolled into the public safety notification platform for the university, which may be administered by the university, without any action on the part of the student. In these cases, subscriber data 122 is provided to the notification platform via an automated subscription process. Subscriptions are processed via a business functionality platform 104. Subscriber information, such as the subscriber's phone number(s), mobile carrier(s), and preferred mobile communication device and/or method, are stored in a subscriber database 102 on notification platform 100.

In some embodiments, each notification platform is administered by a messaging administrator 106. Messaging administrator 106 may be an operator or agent associated with notification platform 100. Alternatively, messaging administrator may be associated with the institution using the notification platform (e.g., with a university), and may administer the notification platform via a self-service web interface. To send an SMS message to subscribers, the messaging administrator generates a Notification Event within notification platform 100. The Notification Event contains the text of the message (e.g., "Exit 20 of Interstate 90 is closed. Seek alternate route."). The Notification Event may also include other information, such as a percentage of messages that are to be successfully delivered in order for the Notification Event to be closed.

When a Notification Event is generated, intelligent messaging platform 150 identifies a communication channel for each subscriber. Channels are selected at least in part based on preloaded preferences of the subscriber, the platform, or both. For instance, intelligent messaging platform 150 may prefer an SMPP connection to a mobile carrier rather than an SMTP connection, if available. Communication channels may also be selected based on dynamic or real-time information about the status of various channels. For instance, the intelligent messaging platform may possess recent data that indicates that the preferred channel to contact a particular subscriber is not responding. The intelligent messaging platform will thus select an alternate, less preferred, channel for that subscriber. In some instances, the intelligent messaging platform identifies the carrier that serves each subscriber by accessing the subscriber data stored in subscriber database 102. In other cases, the intelligent messaging platform performs a carrier lookup to access carrier information stored in an external mobile carrier database 107.

After the messages associated with the Notification Event are sent, intelligent messaging platform monitors the progress and delivery status of each message. If a message is undeliverable, for instance because the channel through which the message was sent is not responding, the intelligent messaging platform will resend the message via an alternate channel. The intelligent messaging platform collects statistics about the progress and delivery status of each individual message as well as aggregate statistics pertaining to the entire Notification Event. These statistics are stored in a message database 124 and may be provided to messaging administrator 106, either automatically or upon request by the messaging administrator.

Although the notification platform is described herein primarily with reference to SMS messages, other types of communication are also supported, such as voice messaging and emails.

2 System Operation

Referring still to FIG. 1, several mobile telecommunications carriers Carrier A, Carrier B, . . . , Carrier G provide mobile telecommunications services to mobile communications devices Device 1, Device 2, Device 3, Device N via a radio interface 101. Each device is associated with a subscriber. For instance, in the example depicted, Device 1 is associated with Subscriber 1, Devices 2 and 3 are associated with Subscriber 2, and Device N is associated with Subscriber N.

When a Notification Event is generated for a group, notification platform 100 sends SMS messages to subscribers of that group via SMPP (Short Message Peer-to-Peer) and SMTP (Simple Mail Transfer Protocol) connections to the carriers associated with the subscribers' devices. In some cases, notification platform 100 communicates directly with the carrier. For instance, notification platform 100 communicates directly with Carrier A via an SMTP connection 108 and communicates directly with Carrier G via an SMPP connection 110. In other cases, notification platform 100 communicates with an aggregator via an SMPP connection; the aggregator then communicates with one or more carriers. For instance, Aggregator I is reached via an SMPP connection 114 and handles messages destined for any of Carriers B, C, or D; Aggregator II is reached via an SMPP connection 118 and handles messages destined for any of Carriers D, E, or F.

In some cases, a carrier may be reachable via more than one channel. For instance, notification platform 100 can communicate with Carrier B either directly via an SMTP connection 112 or via SMPP connection 114 to Aggregator I. Similarly, Carrier F can be reached either directly via an SMPP connection 116 or via SMPP connection 118 to Aggregator II. Carrier D is reachable through either Aggregator I or Aggregator II.

The intelligent messaging platform 150 includes four functional areas: (1) message routing; (2) message status notification; (3) message delivery failover; and (4) message delivery reporting. Each of these functional areas is now described in more detail.

2.1 Message Routing

The Message Routing function of intelligent messaging platform 150 determines the best channel for sending a message to a particular subscriber. The delivery path taken by a message intended for a particular subscriber device depends on the carrier network(s) supporting the subscriber device, the channel(s) available to deliver the message to the carrier network(s), the relative priority of (or preference for) each channel, and the status of each channel.

If the carrier serving a particular subscriber device is not known to intelligent messaging platform 150, the Message Routing function is able to determine the carrier information for the subscriber device. In some cases, the Message Routing function calls a carrier lookup function, which accesses mobile carrier database 107 to retrieve the carrier information for the subscriber. Alternatively, the Message Routing function may identify the appropriate carrier by interpreting failure messages returned by selected (e.g., default) delivery channels.

If a particular subscriber device can be reached via more than one delivery channel, the Message Routing function employs a load balancing mechanism to distribute volume substantially evenly across the multiple available channels.

In addition to using information known at the beginning of a Notification Event (e.g., information obtained upon registration of a subscriber or subscriber device), the Message Routing function can also use information discovered during the Notification Event to adjust the logic used to determine the best route. For example, intelligent messaging platform 100 can process delivery status receipts from a specific channel and dynamically increase or decrease traffic through that channel based on the delivery results and an optimization algorithm. Delivery status receipts for a given message may include, for instance, simple SMTP bounce-backs, aggregator receipt notifications, carrier receipt notifications, or handset delivery notifications.

In addition to using carrier information known at the beginning of a Notification Event (e.g., information obtained upon registration of a subscriber or device), the Message Routing function also makes use of information discovered during the Notification Event to adjust the logic used to determine the best delivery channel. For example, the Message Routing function enables the processing of delivery status receipts from a specific channel. Based on the delivery results, an optimization algorithm may dynamically increase or decrease traffic through that channel. Delivery status receipts may include, for instance, simple SMTP bounce-backs, aggregator receipt notifications, carrier receipt notifications, or handset delivery notifications.

2.2 Message Status Notification

The Message Status Notification function provides the intelligent messaging platform with a mechanism to receive, interpret, and respond to message status updates in order to increase deliverability and throughput and to provide visibility into the end-to-end messaging process.

In the course of sending a message for delivery to a subscriber device, various events are processed to determine the status of the message. Such events may be internal to the intelligent messaging platform (e.g., the sending of the message to a downstream interface). The events may also be externally generated (e.g., a success or error message generated by an aggregator, a carrier, or a subscriber device). The event status is at least informational (e.g., successful delivery to a handset) and in some cases may also be used to drive an action in the intelligent messaging platform (e.g., a delivery failure message causes the intelligent messaging platform to resend the message via an alternate channel).

To address variances in the behavior of multiple downstream delivery channels, the intelligent messaging platform normalizes events returned from the various downstream systems such that the events are represented in a standardized format. In this way, disparate event messages can be interpreted and acted upon in a way that presents a common user experience for the messaging administrator 106 monitoring the system. Failure of the intelligent messaging system to normalize disparate event messages could potentially result in unintended messaging processing behavior, which would make the intelligent messaging platform appear to be behaving in an arbitrary or unpredictable manner.

2.3 Message Delivery Failover

The intelligent messaging platform contains functionality to detect failed message delivery attempts and to automatically mitigate failures via intelligent retry logic.

In some cases, the retry logic initiates subsequent delivery attempts through the initial delivery channel. In other cases, the retry logic sends subsequent delivery attempts through an alternate delivery channel, such as a different aggregator, a direct SMPP connection to the carrier, or an SMTP connection to the carrier. The retry logic selects the channel for the retry attempt based on factors such as a notification indicating an out-of-service delivery channel, an absence of an expected delivery status message within a predetermined time interval, the receipt of a negative status update, or another condition.

In some instances, there are multiple possible channels through which a message can be sent to a given carrier, e.g., one or more SMPP aggregators, one or more SMPP direct carrier binds, and/or a carrier SMS-via-SMTP gateway. The possible channels for each carrier are rank ordered according to preference by the intelligent messaging platform. For instance, a direct SMPP connection to the carrier may be the most preferred channel, where available. When the most preferred method fails or is not available, a secondary delivery method is attempted via a less preferred channel.

The retry logic may take into account the specific service provider (i.e., carrier and/or aggregator) to which the message is delivered, the importance of the message, or the intended channel delivery route, among other factors. For instance, the time period before a retry attempt may vary depending on the aggregator or the carrier to which the message was sent.

2.4 Message Delivery Reporting

The Message Delivery Reporting functionality provides a way for the intelligent messaging platform to determine message status updates, such as the state of a given message or an indication of whether a specific messaging end point (e.g., a subscriber device) has received at least one message. Message Delivery Reporting also allows the intelligent messaging platform to determine whether a subscriber who has registered multiple contact points, possibly spanning multiple communications methods (e.g., SMS text, email, voice, and/or instant messaging) has received at least one message on at least one of the registered contact points as part of a particular Notification Event. Statistics associated with message status updates help the messaging administrator to gauge the success of a Notification Event. These statistics can also be used by administrators of the intelligent messaging platform to tune the logic that controls message processing decisions in order to improve reliability and performance of the intelligent messaging platform.

The Message Delivery Reporting functionality is capable of providing some or all of four levels of reporting associated with the status of a Notification sent to a group of subscribers. In order from lowest to highest level of detail, these four levels include an Event level, a Message level, a User level, and an Overall level.

Event Level Reporting

Event level reporting captures information about each event associated with a send attempt or a status notification for a single message. For example, events involved in sending a message may include some or all of the following: an initial send to an SMPP aggregator, an SMPP response acknowledging receipt of the message by the aggregator, an SMPP delivery receipt indicating receipt of the message by a carrier, a failure notification from the carrier indicating a problem with delivery to the subscriber device, a second send attempt via SMTP, an SMTP failure, a third send attempt to another SMPP aggregator, a delivery receipt indicating delivery of the message to a subscriber handset, an implicit or explicit acknowledgement of receipt by the subscriber, and other similar events. Event level reporting tracks all such activities related to a particular message. The results of Event level reporting are used as input into the processing logic implemented by the intelligent messaging platform.

Message Level Reporting

Message level reporting captures information about the status of a single message over time. The status of a message changes in response to events (e.g., the events listed above) associated with the message and is determined by processing of the event level details associated with the message. The status of a message may include, for instance, waiting for an initial send, sent but waiting for a status notification, delivered, failed, waiting for a retry, and other similar states. In some cases, the status of a message may indicate only that the message was received by a subscriber device. In other cases, the status of a message may indicate that the message was acknowledged by an automatic or manual feedback mechanism invoked by the subscriber who received the message.

Message performance may be aggregated across an entire Notification Event, providing the message administrator with an overview of the message level delivery (e.g., a percentage of messages delivered). For instance, the message performance for a particular Notification Event may indicate that 80% of the intended messages were delivered within two minutes of the initial send.

User Level Reporting

User level reporting captures information about the delivery status of all messages to a single user across all contact points registered to the user, including, for instance, email addresses, phone numbers for voice, and/or phone numbers for text (SMS). Message level detail for each contact point is aggregated to provide user level delivery status information. For example, a subscriber with one voice phone number and one SMS phone number may be marked as successfully contacted by the user level reporting function if the user answered a voice call and/or if an SMS was identified successfully delivered to the subscriber's device.

Overall Reporting

The overall status of a send to multiple subscribers is aggregated from user level detail, message level detail, and event level detail. Various statistics can be provided, such as delivery rates on various channels, delivery rates to types of contact points, a percentage of subscribers reached by any means, success and/or failure percentages for various channels, a percentage of messages delivered within a certain amount of time, and other performance metrics. For example, for a particular Notification Event, the intelligent messaging platform may report that SMS delivery reached 90% of the targeted subscribers within 2 minutes, while email delivery succeeded for only 70% of the targeted subscribers and took 10 minutes to reach those subscribers.

3 EXAMPLES

The following use cases provide exemplary scenarios of the operation of the intelligent messaging platform. While specific messaging technologies are provided in the use cases, any means of distributing messages to endpoints across multiple channels can be supported by the intelligent messaging platform.

3.1 Example 1

Figure 2:
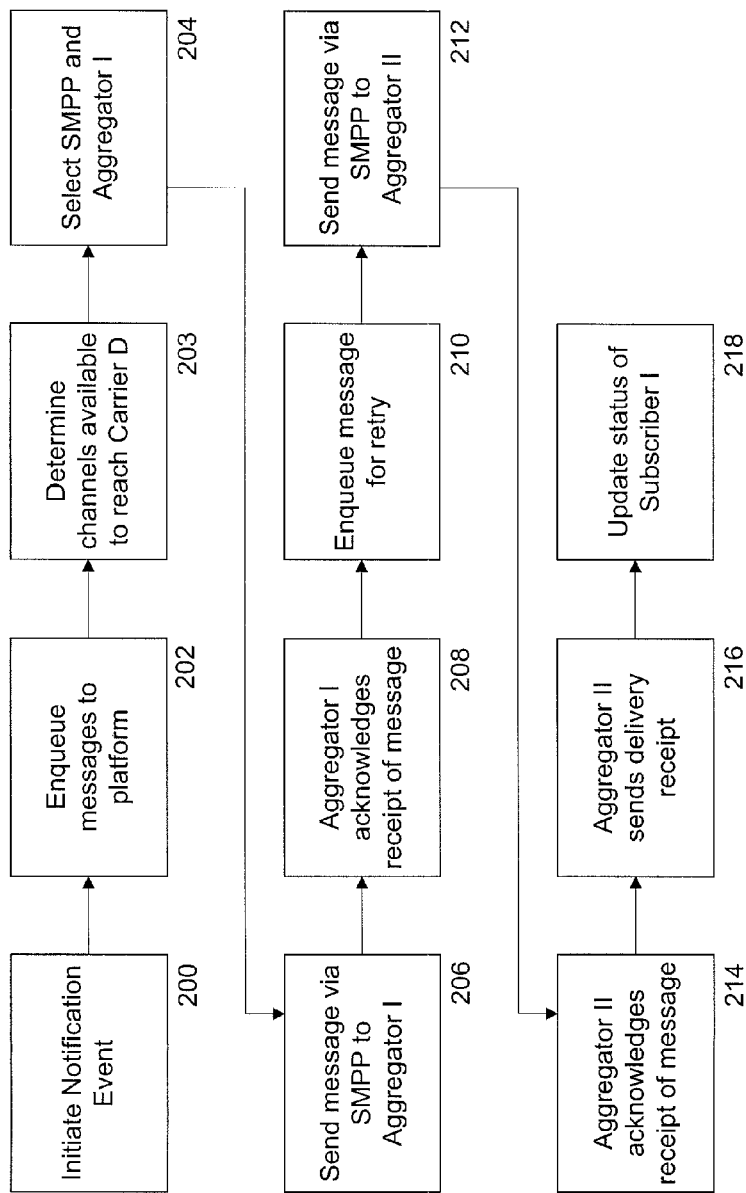
FIG. 2 is a flowchart of an exemplary work flow in which a notification is sent to a subscriber via a carrier supported by multiple aggregators.

Referring to FIGS. 1 and 2, in a first exemplary use case, intelligent messaging platform 150 is used to provide a notification to a subscriber on a carrier supported via multiple aggregators. In particular, in this example, a message is to be sent to Subscriber 1, who has one mobile (SMS enabled) phone number known to be supported by Carrier D.

A Notification Event is initiated by messaging administrator 106 (step 200) and is targeted at a list of subscribers including Subscriber 1. The messages associated with the Notification Event are enqueued to the intelligent messaging platform 150 (step 202).

The intelligent messaging platform determines that Carrier D is reachable through two channels (step 203): SMPP channel 114 through Aggregator I and SMPP channel 118 through Aggregator II. The intelligent messaging platform 150 determines that SMPP is the preferred method for message delivery. Aggregators I and II have equal priority within the rules of the intelligent messaging platform, so one of Aggregators I and II (in this case, Aggregator I) is chosen at random (step 204).

The message is sent via SMPP to Aggregator I (step 206). Aggregator I responds to acknowledge receipt of the message (step 208).

After a predetermined period of time, no further update has been received from Aggregator I. The intelligent messaging platform then enqueues the message for retry (step 210), with SMPP delivery still preferred over SMTP. However, Aggregator I is now excluded from consideration. Aggregator II is thus chosen as the retry channel and the message is resent via SMPP to Aggregator II (step 212). Aggregator II responds to acknowledge receipt of the message (step 214). Once Aggregator II successfully forwards the message to Carrier D, Aggregator II sends a delivery receipt to the intelligent messaging platform to indicate that Carrier D has accepted the message (step 216).

No handset receipt is expected from subscribers supported by Carrier D. Thus, message delivery is considered complete once Carrier D has accepted the message. The intelligent messaging platform updates the status of Subscriber 1 as having been successfully reached by SMS as part of the Notification Event (step 218).

3.2 Example 2

Figure 3:
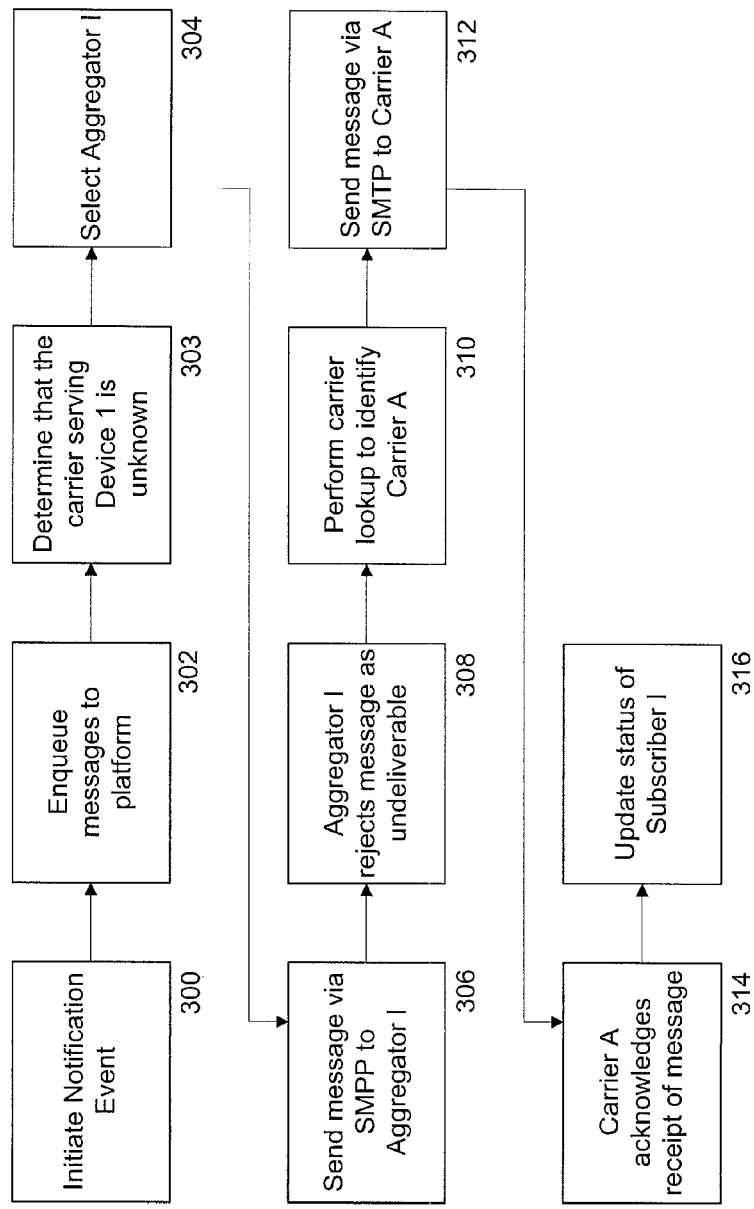
FIG. 3 is a flowchart of an exemplary work flow in which a notification is sent to a subscriber device supported by an unknown carrier network.

Referring to FIGS. 1 and 3, in another exemplary use case, intelligent messaging platform 150 is used to provide a notification to a subscriber device supported by an unknown carrier network. In particular, in this example, a message is to be sent to Subscriber 1, whose mobile (SMS enabled) device Device 1 is supported by a carrier unknown to the intelligent messaging platform.

A notification event is initiated by messaging administrator 106 (step 300) and is targeted at a list of subscribers including Subscriber 1. The messages associated with the notification event are enqueued to the intelligent messaging platform 150 (step 302).

Intelligent messaging platform 150 determines that the carrier serving Device 1 is unknown (step 303). Aggregator I supports message delivery to unknown carriers and therefore the intelligent messaging platform selects Aggregator I as the preferred route for the message to Subscriber 1 (step 304). The message is sent via SMPP to Aggregator I (step 306). Aggregator I responds, rejecting the request as undeliverable (step 308).

The intelligent messaging platform then performs a carrier lookup to mobile carrier database 107 to determine that Device 1 is supported by Carrier A (step 310). The intelligent messaging platform recognizes that Carrier A can be reached only via SMTP. The message is sent via SMTP to Carrier A for delivery (step 312).

Carrier A responds to acknowledge receipt of the message (step 314). No handset receipt is expected from subscribers supported by Carrier A. Thus, message delivery is considered complete once Carrier A has accepted the message. The intelligent messaging platform updates the status of Subscriber 1 has having been successfully reached by SMS as part of the Notification Event (step 316).

3.3 Example 3

Figure 4:
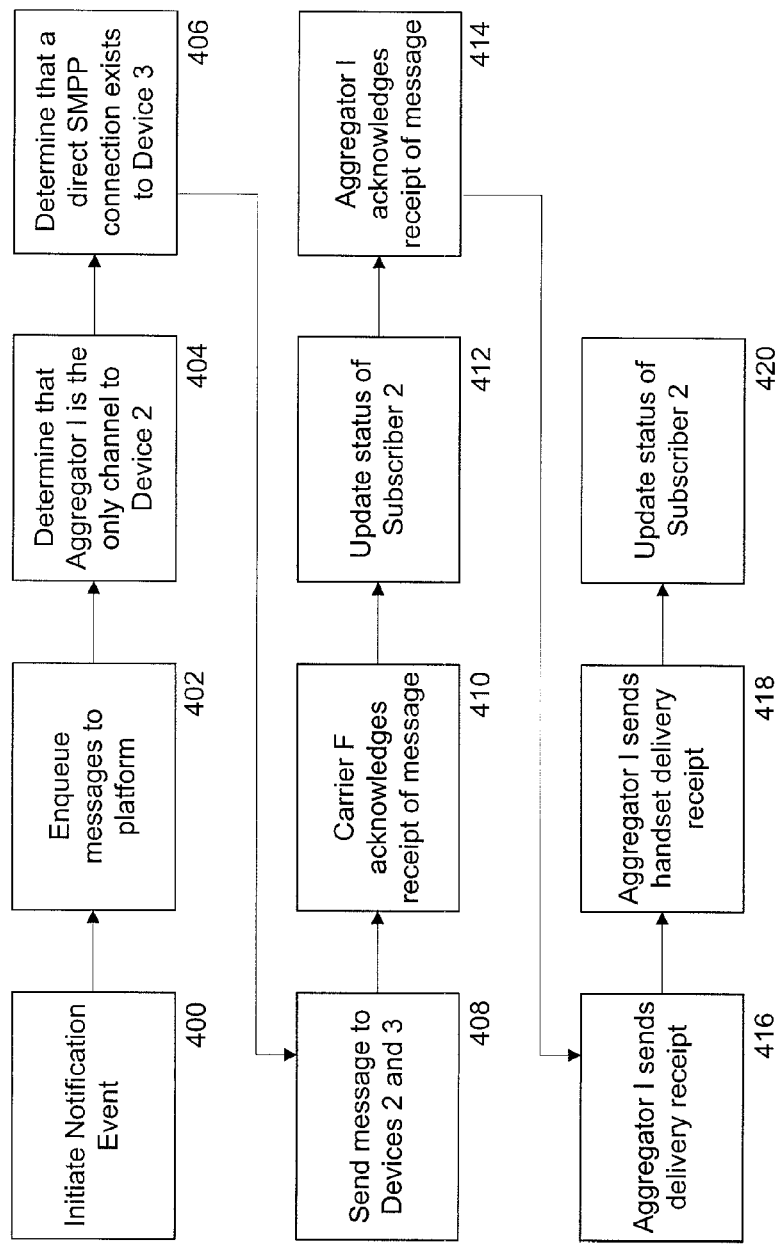
FIG. 4 is a flowchart of an exemplary work flow in which a notification is sent to a subscriber having multiple devices.

Referring to FIGS. 1 and 4, in another exemplary use case, intelligent messaging platform 150 is used to provide a notification to a subscriber having multiple mobile communication devices. In particular, in this example, a message is to be sent to Subscrier 2, who has two mobile (SMS enabled) devices: Device 2, supported by Carrier C; and Device 3, supported by Carrier F.

A Notification Event is initiated by messaging administrator 106 (step 400) and is targeted at a list of subscribers including Subscriber 2. The messages associated with the Notification Event are enqueued to the intelligent messaging platform 150 (step 402).

The intelligent message platform determines that the SMPP connection 114 through Aggregator I is the only, and thus preferred, route for delivery of the message to Device 2 (step 404). The intelligent messaging platform also determines that the direct SMPP connection 116 to Carrier F is the best channel for delivering the message to Device 3 (step 406), because direct SMPP communication is generally preferable to Aggregator communication. The intelligent messaging platform sends the message to Devices 2 and 3 via Aggregator I and the direct SMPP connection, respectively (step 408).

Carrier F responds to acknowledge receipt of the message (step 410). No handset receipt is expected from subscribers supported by Carrier F. Thus, message delivery to Device 3 is considered complete once Carrier F has accepted the message. The intelligent messaging platform updates the status of Subscriber 2 as having been successfully reached by SMS as part of the Notification Event (step 412). However, the notification status of Subscriber 2 remains open pending delivery of the message to Device 2.

Aggregator I also responds to acknowledge receipt of the message (step 414). Once Aggregator I successfully forwards the message to Carrier C, Aggregator I sends a delivery receipt to the intelligent messaging platform to indicate that Carrier C has accepted the message (step 416). The intelligent messaging platform recognizes Carrier C as providing Handset Receipt event messages, and thus the notification status of Subscriber 1 remains open.

When Carrier C successfully delivers the message to Device 2, a handset delivery receipt is sent by Carrier C to Aggregator I, which forwards the handset delivery receipt to the intelligent messaging platform (step 418). At this point, the intelligent messaging platform considers the delivery of the message to Device 2 to be complete.

Subscriber 2 is already flagged as having been successfully reached by SMS. However, the message level delivery tracking is updated to note that all of the devices associated with Subscriber 2 have been reached (step 420).

4 Implementation

The intelligent messaging platform runs on a computing platform, such as, for instance, a multi-threaded computing environment interfaced with external messaging delivery channels and mobile carrier databases via the Internet.

The intelligent messaging platform is described herein with reference to delivery channels including SMPP via SMS aggregators, SMPP direct to carriers, and SMTP direct to carriers. However, the platform can also be configured to be applied to any other messaging technology, such as, e.g., SIP (Session Initiation Protocol), SOAP/XML (Simple Object Access Protocol/Extensible Markup Language), or CAP (Common Alerting Protocol).

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/ or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
sending notification messages to a plurality of subscribers of a notification platform via a plurality of communications devices of the subscribers over a plurality of communications channels, wherein at least one of the channels includes a first aggregator, wherein a status of the at least one of the channels includes a throughput of the first aggregator, wherein each communications device is associated with a mobile telecommunications carrier that provides mobile telecommunications services, wherein each communication device is associated with at least one of the channels from the plurality of communications channels, wherein at least some communications devices are associated with at least two channels from the plurality of communications channels, wherein sending notification messages to the plurality of subscribers comprises sending notification messages that include at least one of short-message-service messages, emails, and voice messages on first and second communications channels that implement at least one of a short-message-peer-to-peer protocol (SMPP) and a simple-mail-transfer protocol (SMTP), monitoring status of the notification messages sent over the first and second communications channel, wherein the monitored status is selected from the group consisting of a simple-mail-transfer-protocol bounce-back, an aggregator receipt notification, a carrier-receipt notification, and a handset-delivery notification, dynamically selecting an alternate communications channel for a subscriber, wherein the dynamically selecting the alternate communications channel comprises causing identification of a carrier connected via at least one of a second aggregator and a direct connection that serves the subscriber, wherein causing identification of the carrier comprises at least one of accessing the subscriber data stored in a subscriber database and causing performance of a carrier lookup to access carrier information stored in an external mobile carrier database, monitoring a status of the notification messages sent over the second communications channel, and based on the monitored statuses, dynamically adapting at least one of the sending and rerouting of the notification messages to subscribers, wherein dynamically adapting at least one of sending and rerouting of the notification messages comprises evaluating and acting upon information indicative of status, and wherein acting upon information indicative of the status comprises sending at least some of the notification messages over second communications channels associated with the at least some communications devices.

2. The method of claim 1, wherein the status of the notification messages includes a delivery status of the notification messages to the communications devices.

3. The method of claim 1, wherein monitoring a status of the first communications channels includes detecting a lack of response within a predetermined amount of time.

4. The method of claim 1, wherein adapting the sending of the notification messages according to the monitored status includes sending at least some of the notification messages over second channel when the results of the monitoring are indicative of a transmission failure.

5. The method of claim 1, wherein the second communications channel is different from the first communications channel.

6. The method of claim 1, wherein the status of the notification the notification messages includes a transmission status of the notification messages routed through the first communications channel.

7. The method of claim 1, further comprising updating a status of the subscribers based on the status of at least one of the first and second communications channels.

8. The method of claim 1, further comprising accepting an instruction to send the notification messages to the plurality of subscribers.

9. The method of claim 1, wherein the notification message comprises a voice message.

10. The method of claim 1, wherein the notification message comprises an SMS message.

11. The method of claim 1, wherein the notification message comprises an email message.

12. The method of claim 1, further comprising updating a status of the subscribers based on the status of the notification messages sent on at least one of the first and second communications channels.

13. The method of claim 1, wherein sending the notification messages includes, for a first one of the communications devices: identifying a first communications channel for communication with the first one of the communications devices; and sending the notification message to the first one of the communications devices via the first communications channel.

14. The method of claim 13, wherein dynamically adapting at least one of the sending and rerouting of the notification messages includes, for the first one of the communications devices: identifying a second communications channel for communication with the first one of the communications devices; and sending the notification messages to the first one of the communications devices via the second communications channel.

15. The method of claim 13, wherein identifying the first communications channel includes identifying a mobile communications carrier associated with the mobile communications device.

16. The method of claim 13, wherein identifying the first communications channel or the second communications channel includes employing a load balancing mechanism.

17. The method of claim 1, wherein monitoring a status of the notification messages includes determining the status of a first notification message based on an event associated with the first notification message.

18. The method of claim 17, wherein determining the status of a first notification message includes receiving an event status message indicative of the event associated with the first notification message from a component of the corresponding first communications channel.

19. An apparatus for communicating with communication devices of subscribers of a notification platform, said apparatus comprising:
  a hardware processor programmed to implement a message-routing module and a message-status module, wherein said message-routing module transmits notification messages to said subscribers of said notification platform via communications devices of the subscribers over a plurality of communications channels, at least one of which includes a first aggregator and has a status that includes a throughput of the first aggregator,
  wherein each communications device is associated with a carrier, wherein at least some of said communications devices are associated with at least two communications channels from said plurality of communications channels, wherein said message-routing module sends the notification messages that include at least one of short-message-service messages, emails, and voice messages on first and second communications channels that implement at least one of a short-message-peer-to-peer protocol (SMPP) and a simple-mail-transfer protocol (SMTP) and that are associated with the communications devices, wherein the message-status module is configured to monitor statuses of the notification messages sent over the first and second communications channels wherein the statuses are selected from the group consisting of a SMTP bounce-back, an aggregator receipt notification, a carrier-receipt notification, and a handset-delivery notification, wherein the message-routing module adapts the sending of the notification messages according to the monitored statuses by dynamically selecting an alternate communications channel for a subscriber by causing identification of a carrier being to connected the subscriber via at least one of an aggregator and a direct connection, wherein causing identification of a carrier comprises at least one of accessing subscriber data stored in a subscriber database and causing performance of a carrier lookup to access carrier information stored in an external mobile carrier database, wherein the message-routing module is configured to dynamically adapt at least one of sending and rerouting of notification messages by evaluating and acting upon information indicative of the monitored status, and wherein the message-routing module is configured to act upon information indicative of monitored status by sending at least some of the notification messages over second communications channels associated with the at least some of communications devices.

20. The apparatus of claim 19, wherein the message-status module determines the status of a first notification message based on an event associated with the first notification message.

21. The apparatus of claim 19, wherein the message-routing module sends at least some of the notification messages over a second communications channel when the results of the monitoring are indicative of a transmission failure.

22. The apparatus of claim 19, further comprising an input module that accepts instructions to send the notification messages to the plurality of subscribers.

23. The apparatus of claim 19, wherein the message-routing module comprises: a channel-selection module that identifies a first communications channel for communication with a first one of the communications devices; and an output module that sends the notification message to the first one of the communications devices via the first communications channel.

24. The apparatus of claim 23, wherein the channel-selection module identifies a mobile communications carrier associated with the communications device.

25. The apparatus of claim 23, wherein the channel-selection module employs a load balancing mechanism to identify the first communications channel or the second communications channel.

26. The apparatus of claim 19, wherein the message-status module monitors a status of the second communications channels and a status of the notification messages sent over the second communications channel.

27. The apparatus of claim 26, further comprising a subscriber-data module that updates a status of the subscribers based on at least one of the status of the first communications channels, the status of the notification messages sent over the first communications channel, the status of the second communications channels, and the status of the notification messages sent over the second communications channel.

28. A manufacture comprising a non-transitory computer-readable medium having encoded thereon instructions for causing a computer system to execute a computer-implemented method of sending notification messages to a plurality of subscribers of a notification platform via a plurality of communications devices of the subscribers over a plurality of communications channels, wherein at least one of the channels includes a first aggregator, wherein a status of the at least one of the channels includes a throughput of the first aggregator, wherein each communications device is associated with a mobile telecommunications carrier that provides mobile telecommunications services, wherein each communication device is associated with at least one of the channels from the plurality of communications channels, wherein at least some communications devices are associated with at least two channels from the plurality of communications channels, wherein sending notification messages to the plurality of subscribers comprises sending notification messages that include at least one of short-message-service messages, emails, and voice messages on first and second communications channels that implement at least one of a short-message-peer-to-peer protocol (SMPP) and a simple-mail-transfer protocol (SMTP),monitoring status of the notification messages sent over the first and second communications channel, wherein the monitored status is selected from the group consisting of a simple-mail-transfer-protocol bounce-back, an aggregator receipt notification, a carrier-receipt notification, and a handset-delivery notification, dynamically selecting an alternate communications channel for a subscriber, wherein dynamically selecting the alternate communications channel comprises causing identification of a carrier connected via at least one of a second aggregator and a direct connection that serves the subscriber, wherein causing identification of the carrier comprises at least one of accessing the subscriber data stored in a subscriber database and causing performance of a carrier lookup to access carrier information stored in an external mobile carrier database, monitoring a status of the notification messages sent over the second communications channel, and based on the monitored statuses, dynamically adapting at least one of the sending and rerouting of the notification messages to subscribers, wherein dynamically adapting at least one of sending and rerouting of the notification messages comprises evaluating and acting upon information indicative of status, and wherein acting upon information indicative of the status comprises sending at least some of the notification messages over second communications channels associated with the at least some communications devices.

* * * * *